United States Patent
Taguchi et al.

(10) Patent No.: US 8,852,496 B2
(45) Date of Patent: Oct. 7, 2014

(54) DECURLING METHOD AND APPARATUS, AND FILM PRODUCTION METHOD

(75) Inventors: Takao Taguchi, Kanagawa (JP); Masaki Sonobe, Kanagawa (JP); Takahiro Oba, Kanagawa (JP); Hideaki Mizutani, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 304 days.

(21) Appl. No.: 13/074,043

(22) Filed: Mar. 29, 2011

(65) Prior Publication Data
US 2011/0241255 A1    Oct. 6, 2011

(30) Foreign Application Priority Data
Mar. 31, 2010 (JP) ................................. 2010-081782

(51) Int. Cl.
| | | |
|---|---|---|
| B29C 53/18 | (2006.01) | |
| B65H 23/34 | (2006.01) | |
| B65H 20/16 | (2006.01) | |
| B29L 9/00 | (2006.01) | |

(52) U.S. Cl.
CPC .............. B29C 53/18 (2013.01); B65H 2406/11 (2013.01); B29L 2009/00 (2013.01); B65H 23/34 (2013.01); B65H 2301/51145 (2013.01); B65H 20/16 (2013.01)
USPC ........... 264/519; 264/234; 264/235; 264/237; 264/345; 264/346; 425/403.1; 226/7; 226/97.1; 226/97.3

(58) Field of Classification Search
USPC ................. 264/345, 346, 234, 235, 237, 519; 425/403.1; 226/7, 97.1, 97.3
See application file for complete search history.

(56) References Cited

U.S. PATENT DOCUMENTS

| | | | | |
|---|---|---|---|---|
| 3,097,971 A | * | 7/1963 | Carlisle et al. | .................... 134/15 |
| 4,698,914 A | * | 10/1987 | Shu et al. | ......................... 34/370 |
| 4,836,429 A | * | 6/1989 | Nakashima et al. | .............. 226/7 |
| 5,752,641 A | * | 5/1998 | Klas et al. | ..................... 226/97.3 |

(Continued)

FOREIGN PATENT DOCUMENTS

| | | | | | |
|---|---|---|---|---|---|
| JP | 62247032 A | * | 10/1987 | ................ | C21D 9/63 |
| JP | 63125623 A | * | 5/1988 | ................ | C21D 9/63 |

(Continued)

OTHER PUBLICATIONS

English machine translation of JP 2003-195051, retrieved from JPO database May 8, 2013.*

(Continued)

*Primary Examiner* — Timothy Kennedy
(74) *Attorney, Agent, or Firm* — Young & Thompson

(57) ABSTRACT

A continuous multi-layer film includes a support layer having a first film surface, and a hard coat layer, formed on the support layer, having a second film surface, and having a curling tendency in an inward direction. In the decurling method, the multi-layer film is transported. A first transition of the support layer in the multi-layer film being transported into a rubber phase is induced by supplying fluid vapor on the support layer. After supplying the fluid vapor, a second transition of the support layer from the rubber phase into a glass phase is induced. The multi-layer film is transported while a portion of the support layer in the rubber phase is prevented from contacting a solid object. The hard coat layer is formed from a polymer produced from an ultraviolet curable compound, and the support layer is formed from cellulose acylate.

14 Claims, 11 Drawing Sheets

(56) References Cited

U.S. PATENT DOCUMENTS

| | | | |
|---|---|---|---|
| 7,311,234 B2* | 12/2007 | Solberg | 226/97.3 |
| 2003/0096093 A1* | 5/2003 | Sakamaki | 425/536 |
| 2005/0142304 A1* | 6/2005 | Kawanishi et al. | 428/1.31 |
| 2006/0093759 A1* | 5/2006 | Fukagawa | 428/1.31 |
| 2006/0175257 A1* | 8/2006 | Nakamura et al. | 210/639 |
| 2007/0024684 A1* | 2/2007 | Konno et al. | 347/95 |
| 2010/0222567 A1* | 9/2010 | Otoshi | 536/69 |
| 2011/0198378 A1* | 8/2011 | Chang et al. | 226/7 |

FOREIGN PATENT DOCUMENTS

| | | | | |
|---|---|---|---|---|
| JP | 02061009 A | * | 3/1990 | C21D 9/63 |
| JP | 02-127024 | | 5/1990 | |
| JP | 09193240 A | * | 7/1997 | B29C 55/02 |
| JP | 2003-195051 | | 7/2003 | |

OTHER PUBLICATIONS

Japanese Office Action dated Jul. 23, 2014 in corresponding Japanese Patent Application No. 2011-072204 with English translation of Japanese Office Action.

* cited by examiner

DECURLING METHOD AND APPARATUS, AND FILM PRODUCTION METHOD

BACKGROUND OF THE INVENTION

1. Field of the Invention

The present invention relates to a decurling method and apparatus, and film production method. More particularly, the present invention relates to a decurling method and apparatus in which a multi-layer film to be produced can be free from occurrence of fold creases, and film production method for the multi-layer film.

2. Description Related to the Prior Art

Cellulose acylate film is a polymer film having good performance with transparent and soft property. Various uses of the polymer film are known, including a window laminate, touch panel film, film for an ITO board, membrane switch film, three dimensional decorative film, optical functional film for a flat panel display panel, and the like.

Those uses are classified in two types. In a first type, a surface of the polymer film is touched by a finger, fabric, touch pen or the like. In a second type, the surface of the polymer film is rubbed by a finger, fabric, touch pen or the like. There occurs a problem of possible scratch on the surface of the polymer film. To solve this problem, a hard coat layer is formed on the polymer film with a higher hardness than the polymer film.

An example of method of producing a multi-layer film including the hard coat layer formed on the polymer film. In a first step of coating application or coating step, a surface of the polymer film is coated with a material curable with curing energy such as ultraviolet radiation and an electron beam, to form a layer. Then in a drying step, the layer is dried. In a step of curing or energy application, the curing energy is applied to the layer. The layer becomes the hard coat layer upon application of the curing energy. The multi-layer film is obtained as a product.

Reaction of the polymerization is used for changing the layer into the hard coat layer. There occurs a curl in the multi-layer film in the polymerization in a manner to direct the hard coat layer inwards. Phenomena of curling have been found in various kinds of the multi-layer film including the multi-layer film having the hard coat layer. To decurl the multi-layer film, JP-A 2003-195051 discloses a method of vapor supply step to apply fluid vapor to the multi-layer film, the fluid vapor being one of water vapor or non-water vapor of organic solvent.

For mass production of the multi-layer film, transport rollers are used to transport a support film of a continuous form. Plural devices are arranged on a transport path for the support film, including a coater, a dryer, and a curing energy source in an order in a moving direction. The coater is used for the coating application of the layer. The curing energy source is used for the curing. Also, a vapor source is disposed downstream of the curing energy source for decurling the multi-layer film if a curl has occurred in the multi-layer film. It is possible to produce the multi-layer film in a large scale under the curl control, because the coating application, the curing and the vapor supply step can be consecutive.

In FIGS. 11 and 12, multi-layer film 201 includes a support layer 201b and a hard coat layer 201a. It is likely that fold creases or wrinkles 205 are created on the multi-layer film 201 before or after a task in the vapor source for the vapor supply step. The fold creases 205 protrude from the surface of the multi-layer film 201 and extends in a moving direction A of the multi-layer film 201. A height H of the fold creases 205 in a serious situation may be as large as 1 mm. The multi-layer film 201 cannot be used as a product if the fold creases 205 are present.

SUMMARY OF THE INVENTION

In view of the foregoing problems, an object of the present invention is to provide a decurling method and apparatus in which a multi-layer film to be produced can be free from occurrence of fold creases, and film production method for the multi-layer film.

In order to achieve the above and other objects and advantages of this invention, a decurling method for a continuous multi-layer film is provided, the multi-layer film including a first layer having a first film surface, and a second layer, overlaid on the first layer opposite to the first film surface, having an external second film surface, wherein there is a curling tendency in an outward direction with the second film surface. The decurling method includes transporting the multi-layer film. A first transition of the second layer during transport into a rubber phase is induced by supplying fluid vapor on the second film surface. A second transition of the second layer from the rubber phase into a glass phase is induced by stopping supplying the fluid vapor. During the first or second transition, the multi-layer film is transported while the second layer is prevented from contacting a solid object.

Also, a decurling method for a continuous multi-layer film is provided, the multi-layer film including a first layer having a first film surface, and a second layer, overlaid on the first layer opposite to the first film surface, having an external second film surface, wherein there is a curling tendency in an outward direction with the second film surface. The decurling method includes transporting the multi-layer film. A first transition of the second layer in the multi-layer film being transported into a rubber phase is induced by supplying fluid vapor on the second film surface. A second transition of the second layer from the rubber phase into a glass phase is induced by stopping supplying the fluid vapor. While the multi-layer film is transported, a portion of the second layer in the rubber phase is prevented from contacting a solid object.

During the first or second transition, the multi-layer film is transported while the second layer is prevented from contacting a solid object.

Floating gas is discharged upwards to the multi-layer film for transport by floating the multi-layer film.

Preferably, web edge portions of the multi-layer film are clamped by use of clip devices, and the clip devices are moved to transport the multi-layer film longitudinally.

Preferably, the multi-layer film is transported by plural transport rollers arranged in a longitudinal direction of the multi-layer film for supporting the second film surface. The fluid vapor is discharged in a fluid vapor flow area positioned between two adjacent transport rollers among the transport rollers along the multi-layer film. A distance between the fluid vapor flow area and the transport rollers is equal to or more than 100 mm.

Furthermore, a fluid vapor content of a contacting portion of the multi-layer film contacting the transport rollers is maintained in a range lower than a fluid vapor content of the second film surface supplied with the fluid vapor.

In the maintaining step, the fluid vapor directed toward the contacting portion is aspirated or blocked.

Preferably, in the maintaining step, dry gas is supplied to the contacting portion.

The multi-layer film is transported in an upward direction.

Before supplying the fluid vapor, the multi-layer film is preheated within a range of setting the second layer at temperature equal to or lower than a glass transition temperature of a component therein.

The first layer is formed from a polymer produced from an ultraviolet curable compound or an electron beam curable compound, and the second layer is formed from cellulose acylate.

The fluid vapor contains water vapor.

Also, a decurling method for a continuous multi-layer film is provided, the multi-layer film including a first layer having a first film surface, and a second layer, formed on the first layer, having a second film surface, and having a curling tendency in an outward direction. The decurling method includes transporting the multi-layer film with plural transport rollers. A first transition of the second layer into a rubber phase is induced by supplying fluid vapor on the second layer between two adjacent transport rollers among the transport rollers. After supplying the fluid vapor, a second transition of the second layer from the rubber phase into a glass phase is induced. A fluid vapor content of a contacting portion of the multi-layer film contacting the transport rollers is maintained in a range lower than a fluid vapor content of the second film surface supplied with the fluid vapor.

Also, a film production method of producing a continuous multi-layer film is provided, the multi-layer film including a first layer having a first film surface, and a second layer, formed on the first layer, having a second film surface, and having a curling tendency in an outward direction. The film production method includes transporting the multi-layer film. A first transition of the second layer in the multi-layer film being transported into a rubber phase is induced by supplying fluid vapor on the second layer. After supplying the fluid vapor, a second transition of the second layer from the rubber phase into a glass phase is induced. The multi-layer film is transported while a portion of the second layer in the rubber phase is prevented from contacting a solid object.

Also, a decurling apparatus for a continuous multi-layer film is provided, the multi-layer film including a first layer having a first film surface, and a second layer, formed on the first layer, having a second film surface, and having a curling tendency in an outward direction. The decurling apparatus includes a moving device for transporting the multi-layer film. A fluid vapor source induces a first transition of the second layer in the multi-layer film being transported into a rubber phase by supplying fluid vapor on the second layer, and after supplying the fluid vapor, changes over supply of the fluid vapor to induce a second transition of the second layer from the rubber phase into a glass phase. During the first or second transition, the moving device transports the multi-layer film while the second layer is prevented from contacting a solid object.

Also, a decurling apparatus for a continuous multi-layer film is provided, the multi-layer film including a first layer having a first film surface, and a second layer, formed on the first layer, having a second film surface, and having a curling tendency in an outward direction. The decurling apparatus includes a moving device for transporting the multi-layer film. A fluid vapor source induces a first transition of the second layer in the multi-layer film being transported into a rubber phase by supplying fluid vapor on the second layer, and after supplying the fluid vapor, changes over supply of the fluid vapor to induce a second transition of the second layer from the rubber phase into a glass phase. The moving device transports the multi-layer film while a portion of the second layer in the rubber phase is prevented from contacting a solid object.

During the first or second transition, the moving device transports the multi-layer film while the second layer is prevented from contacting a solid object.

The moving device includes a floating transport device for discharging floating gas upwards to the multi-layer film for transport by floating the multi-layer film.

Preferably, the moving device includes clip devices for clamping respectively web edge portions of the multi-layer film. A moving mechanism moves the clip devices to transport the multi-layer film longitudinally.

Preferably, the moving device includes a transport roller disposed upstream or downstream of the fluid vapor source. Furthermore, a nozzle is formed in the fluid vapor source, for discharging the fluid vapor. A distance between the nozzle and the transport roller is equal to or more than 100 mm.

Furthermore, a drying conditioner maintains a fluid vapor content of a contacting portion of the multi-layer film contacting the transport rollers in a range lower than a fluid vapor content of the second film surface supplied with the fluid vapor.

The drying conditioner aspirates or blocks the fluid vapor directed toward the contacting portion.

Preferably, the drying conditioner includes a dry gas supply source for supplying the contacting portion with dry gas.

Also, a decurling apparatus for a continuous multi-layer film is provided, the multi-layer film including a first layer having a first film surface, and a second layer, formed on the first layer, having a second film surface, and having a curling tendency in an outward direction. The decurling apparatus includes a moving device, having plural transport rollers, for transporting the multi-layer film. A fluid vapor source is disposed upstream or downstream of one of the transport rollers, for inducing a first transition of the second layer into a rubber phase by supplying fluid vapor on the second layer between two adjacent transport rollers among the transport rollers, and for, after supplying the fluid vapor, changing over supply of the fluid vapor to induce a second transition of the second layer from the rubber phase into a glass phase. A drying conditioner maintains a fluid vapor content of a contacting portion of the multi-layer film contacting the transport rollers in a range lower than a fluid vapor content of the second film surface supplied with the fluid vapor.

Consequently, the multi-layer film to be produced can be free from occurrence of fold creases, because the second layer is prevented from contacting a solid object during the transition into and from the rubber phase.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT(S) OF THE PRESENT INVENTION

Figure 1:
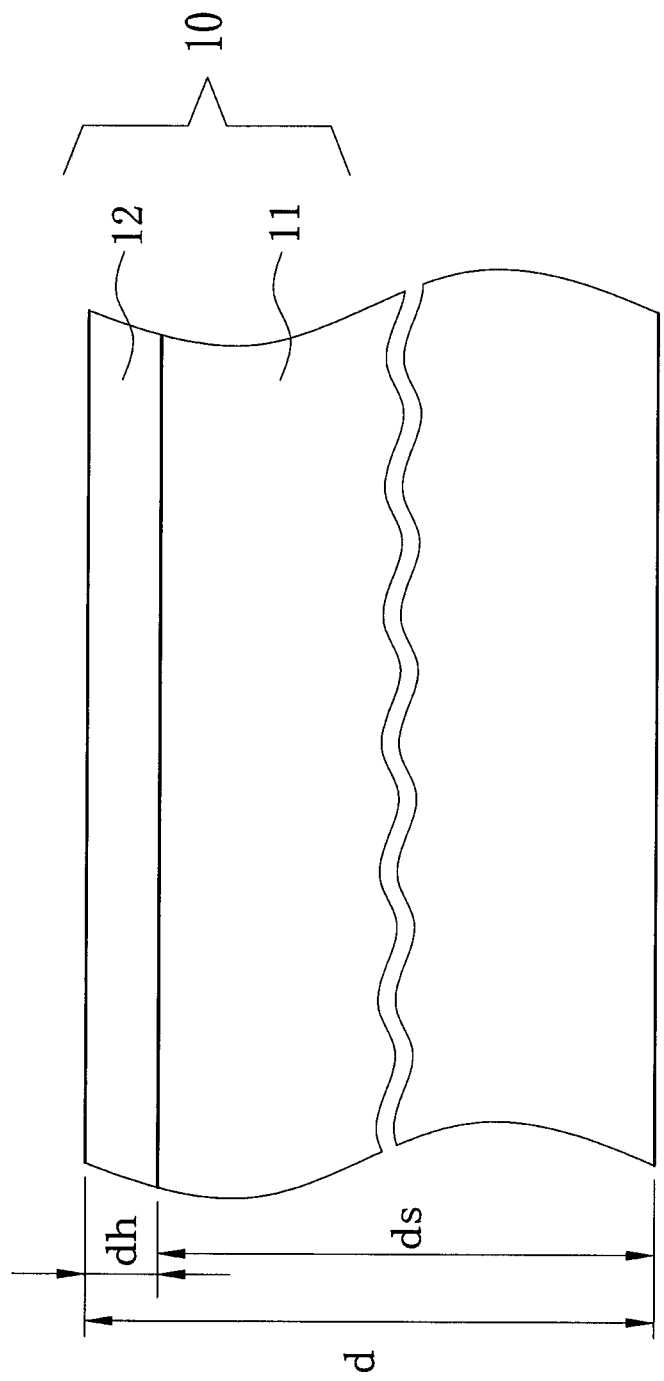
FIG. 1 is a plan illustrating multi-layer film.

In FIG. 1, a multi-layer film 10 includes a support layer 11 and a hard coat layer 12 having a higher hardness than the support layer 11. A thickness d of the multi-layer film 10 is not limited, but preferably equal to or more than 5 microns and equal to or less than 120 microns, and specifically preferably equal to or more than 40 microns and equal to or less than 100 microns. A ratio dh/ds between a thickness ds of the support layer 11 to a thickness dh of the hard coat layer 12 is preferably equal to or more than 0.04 and equal to or less than 0.50, and specifically preferably equal to or more than 0.10 and equal to or less than 0.40.

Figure 2:
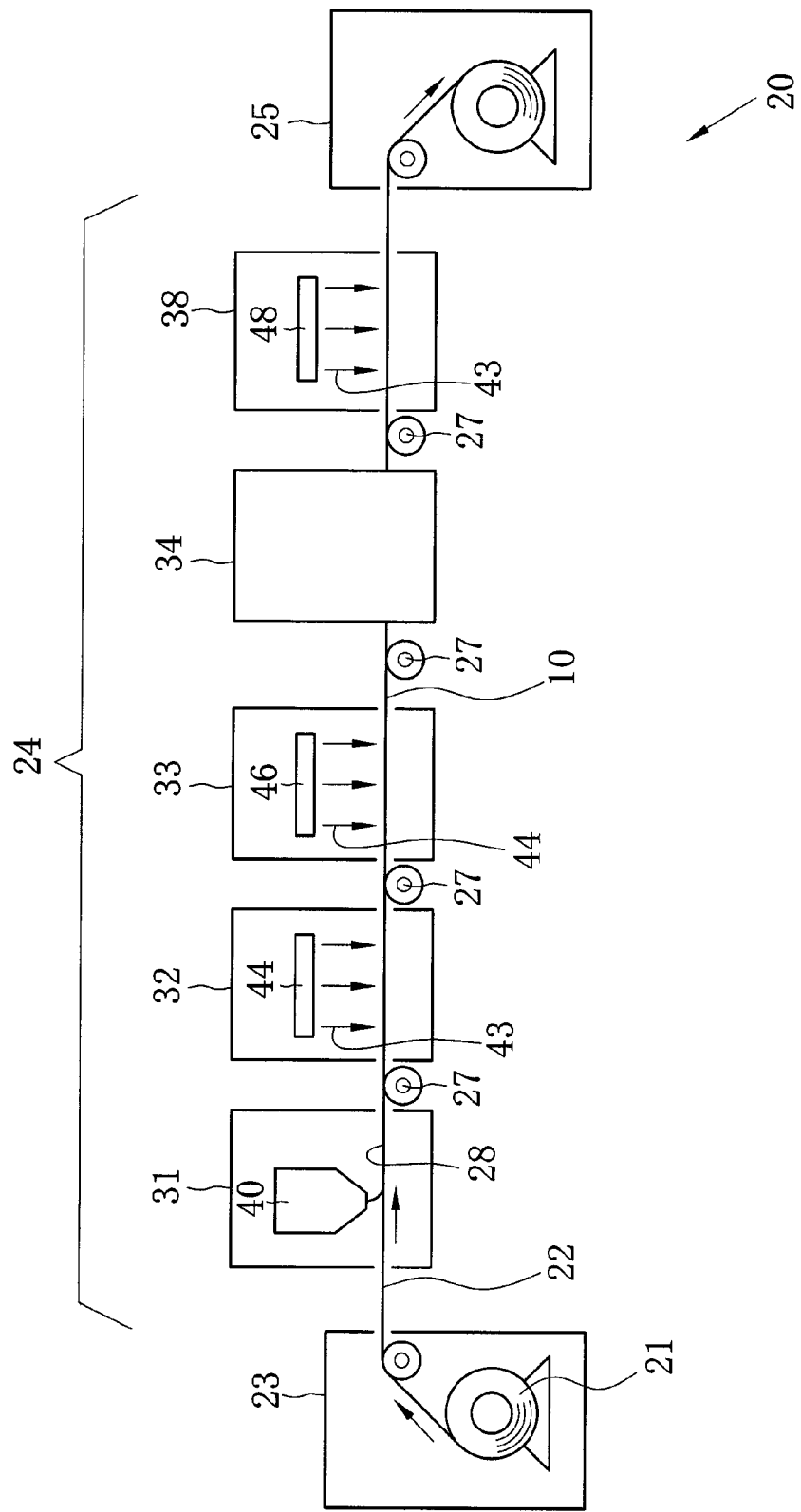
FIG. 2 is an explanatory view in a side elevation, illustrating a multi-layer film production system.

In FIG. 2, a multi-layer film production system 20 produces the multi-layer film 10. The multi-layer film production system 20 includes a film dispenser 23, a moving path 24 for a moving device, and a film winder 25. There is a support film roll 21 from which support film 22 is advanced by the film dispenser 23. In the moving path 24, the multi-layer film 10 is produced from the support film 22. The film winder 25 winds the multi-layer film 10 from the moving path 24 in a roll form. A plurality of transport rollers 27 as moving device are arranged on the moving path 24 from the film dispenser 23 toward the film winder 25.

[Support Film]

A material for the support film 22 is not limited particularly, but preferably can be polymer. Among various examples of polymer, cellulose acylates are preferable. Details of cellulose acylates will described later.

Plural devices are arranged on the moving path 24 from the film dispenser 23 toward the film winder 25, including a coater 31 for layer forming, a dryer 32 as drying conditioner, an ultraviolet irradiator 33, and a decurling apparatus 34 or decurler. The coater 31 forms a layer 28 on the support film 22. The dryer 32 dries the layer 28. The ultraviolet irradiator 33 applies ultraviolet rays to the layer 28. The decurling apparatus 34 removes a curl created with the multi-layer film 10 in the course of ultraviolet radiation. Additionally, a dryer 38 as drying conditioner may be disposed between the decurling apparatus 34 and the film winder 25 to dry the multi-layer film 10.

A coating die 40 is incorporated in the coater 31, and discharges the coating solution. The coating die 40 coats a surface of the support film 22 with the coating solution, to form the layer 28 on the support film 22. For preparation, the coating solution is formed from solvent of a suitable type and an ultraviolet curable compound dissolved or dispersed colloidally therein. A density of the ultraviolet curable compound can be determined for a purpose, and is preferably in a range equal to or more than 10 wt. % and equal to or less than 95 wt. %.

[Ultraviolet Curable Compounds]

Preferable examples of the ultraviolet curable compounds are polyfunctional monomers and oligomers of an ionizing radiation curable property. Functional groups of the polyfunctional monomers and oligomers of the ionizing radiation curable property include groups polymerizable with actinic energy such as light, electron beam and radiation. Among those, photopolymerizable functional groups are specially preferable. Examples of the photopolymerizable functional groups are a (meth)acryloyl group, vinyl group, styryl group, allyl group and other unsaturated photopolymerizable functional groups. Among those, the (meth)acryloyl group is specially preferable.

[Solvent]

The solvent is preferably a compound in which substances in the support film 22 are insoluble. Also, the solvent can be a compound for swelling the substances in the support film 22 to tighten the contact between the support layer 11 and the hard coat layer 12 in the multi-layer film 10. Furthermore, the solvent can be a compound in which an ultraviolet curable compound will be soluble or dispersible uniformly without precipitation. Two or more examples of solvents can be used in combination.

Preferred examples of solvents as dispersion medium include alcohols, ketones, esters, amides, ethers, ether esters, hydrocarbons, halogenated hydrocarbons and the like. Among those, specific examples are as follows:

alcohols (methanol, ethanol, propanol, butanol, benzyl alcohol, ethylene glycol, propylene glycol, ethylene glycol monoacetate and the like);

ketones (methyl ethyl ketone, methyl isobutyl ketone, cyclohexanone, methyl cyclohexanone and the like);

esters (methyl acetate, ethyl acetate, propyl acetate, butyl acetate, ethyl formate, propyl formate, butyl formate, ethyl lactate and the like);

aliphatic hydrocarbons (hexane, cyclohexane and the like);

halogenated hydrocarbons (methylene chloride, methyl chloroform and the like);

aromatic hydrocarbons (toluene, xylene and the like);

amides (dimethylformamide, dimethyl acetoamide, n-methylpyrrolidone and the like);

ethers (dioxane, tetrahydrofuran, ethylene glycol dimethyl ether, propylene glycol dimethyl ether and the like);

ether alcohols (1-methoxy-2-propanol, ethyl cellosolve, methyl carbinol and the like);

fluoroalcohols (compounds disposed in JP-A 8-143709, paragraph 0020, and JP-A 11-060807, paragraph 0037).

Any one of the examples of solvents can be used. Also, two or more of those can be used in a mixed state. Preferable solvents include toluene, xylene, methyl ethyl ketone, methyl isobutyl ketone, cyclohexanone, methanol, iso-propanol, butanol and the like. Solvent compositions containing a ketone solvent (methyl ethyl ketone, methyl isobutyl ketone, cyclohexanone and the like) as a main component are also preferable. A content of the ketone solvent is preferably equal to or more than 10 wt. % of the total content of the solvents contained in the curable composition. The content of the ketone solvent is desirably equal to or more than 30 wt. % of the total of the content of the solvents.

The dryer 32 includes a dry gas supply source 44. Dry gas 43 is blown to the layer 28 by the dry gas supply source 44. The ultraviolet irradiator 33 includes an ultraviolet radiation source 46 for applying ultraviolet rays to the layer 28. The ultraviolet radiation source 46 emits the ultraviolet rays. Examples of the ultraviolet radiation source 46 include a low pressure mercury lamp, medium pressure mercury lamp, high pressure mercury lamp, ultra-high pressure mercury lamp, carbon arc lamp, metal halide lamp, and xenon lamp.

The decurling apparatus 34 decurls the multi-layer film 10. Details of the decurling apparatus 34 will be described later. A dry gas supply source 48 is incorporated in the dryer 38 for blowing the dry gas 43 to the multi-layer film 10. Water, solvent and other fluids are evaporated from the multi-layer film 10 by contact of the dry gas 43.

[Decurling Apparatus]

Figure 3:
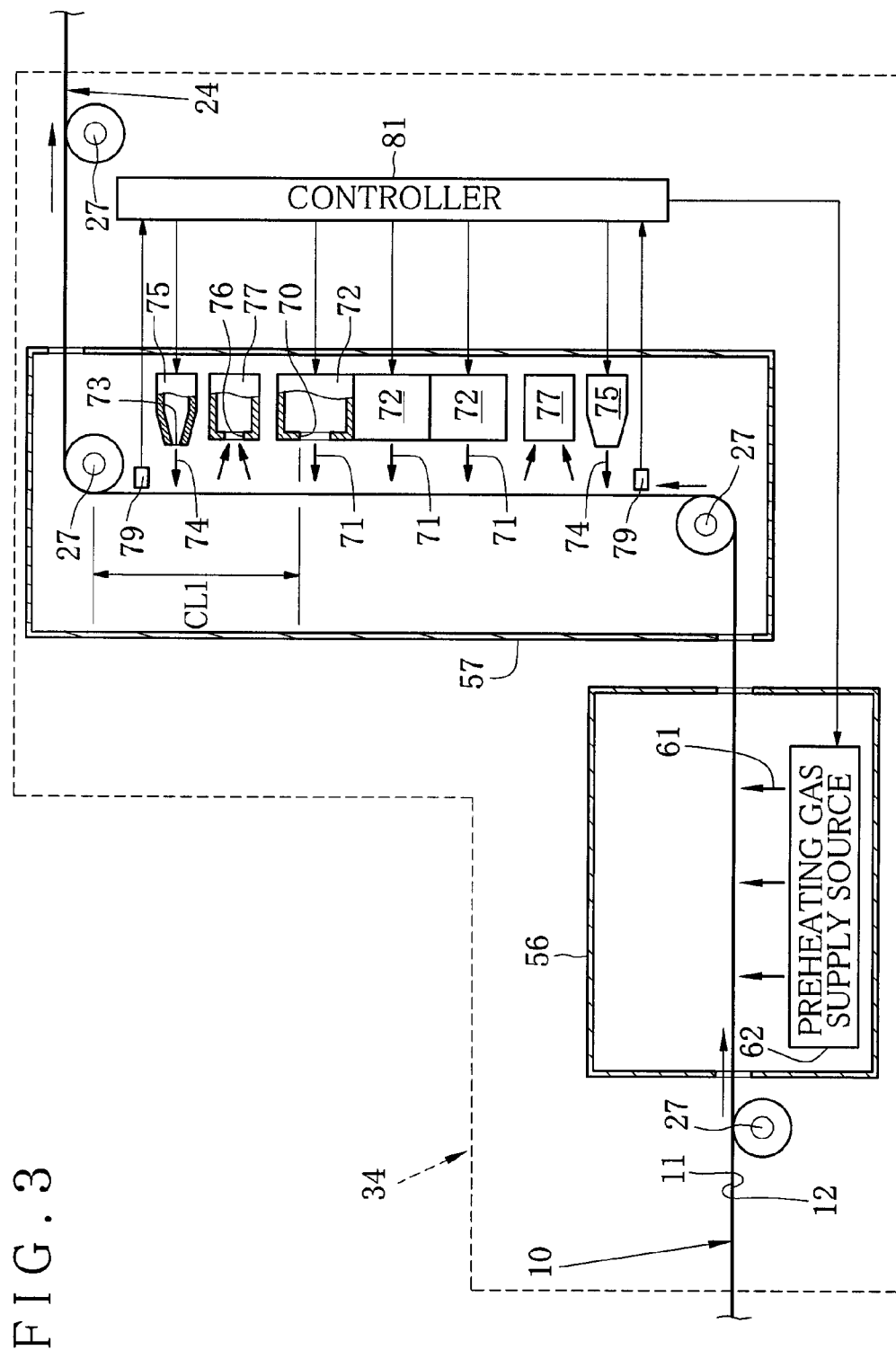
FIG. 3 is an explanatory view in a vertical section, illustrating a decurling apparatus having a fluid vapor delivery zone.

In FIG. 3, the decurling apparatus 34 includes a preheat zone 56 or chamber or case, and a fluid vapor delivery zone 57 or chamber or case. The moving path 24 where the transport rollers 27 are arranged extends through the preheat zone 56 and the fluid vapor delivery zone 57 arranged in a moving direction of the support film 22.

A preheating gas supply source 62 is disposed in the preheat zone 56. Preheating gas 61 is discharged by the preheating gas supply source 62. The preheating gas supply source 62 is disposed on one side of the moving path 24. The preheating gas supply source 62 is preferably opposed to the support layer 11 of the multi-layer film 10 transported through the preheat zone 56. Also, the preheating gas supply source 62 can be disposed on each one of two sides of the moving path 24 and opposed to the support layer 11 and the hard coat layer 12.

It is preferable to carry out heating of the multi-layer film 10 with the preheating gas 61 to set the temperature Tf of the compounds in the support layer 11 near the glass transition temperature Tg0 of the support layer 11 without becoming higher than the glass transition temperature Tg0. A preferable range of (Tg-Tf) is equal to or more than 30 deg. C. and equal to or less than 80 deg. C. Note that the glass transition temperature Tg0 (Tg) is the glass transition temperature of the support layer 11 after the irradiating step and before the vapor supply step.

The moving path 24 inside the fluid vapor delivery zone 57 is formed in an upward direction with the arrangement of the transport rollers 27. Plural fluid vapor sources 72 are disposed between two adjacent ones of the transport rollers 27. A slot nozzle 70 is formed in each of the fluid vapor sources 72. Fluid vapor 71 (water vapor and non water vapor) is discharged by the slot nozzle 70. It is possible to dispose a dry gas supply source 75 as drying conditioner and a suction device 77 as drying conditioner between two adjacent ones of the transport rollers 27. A slot nozzle 73 is formed in the dry gas supply source 75. Dry gas 74 is discharged through the slot nozzle 73 to scatter the fluid vapor 71 in the vicinity of the multi-layer film 10. In the suction device 77, a suction slot or suction nozzle 76 is formed for suction with a suction pump and removal of the fluid vapor 71. Sensor assemblies 79 are disposed between two adjacent ones of the transport rollers 27, and include various sensors. The fluid vapor sources 72, the dry gas supply source 75, the suction device 77 and the sensor assemblies 79 are arranged on the moving path 24, and opposed to the support layer 11 of the multi-layer film 10 transported through the fluid vapor delivery zone 57.

It is possible to dispose the fluid vapor sources 72, the dry gas supply source 75, the suction device 77 and the sensor assemblies 79 on each of two sides of the moving path 24. Also, it is possible to omit either one of the dry gas supply source 75 and the suction device 77, or both of those.

A plurality of the fluid vapor sources 72 are arranged on the moving path 24. The dry gas supply source 75 is disposed on each of upstream and downstream sides from the fluid vapor sources 72. Note that the dry gas supply source 75 may be disposed only downstream of one of the fluid vapor sources 72 in the moving direction.

The suction device 77 is disposed between the fluid vapor sources 72 and the dry gas supply source 75. One of the sensor assemblies 79 is positioned upstream of the suction device 77 (or the first dry gas supply source 75) in the moving direction. A second one of the sensor assemblies 79 is positioned downstream of the fluid vapor sources 72 (or the second dry gas supply source 75) in the moving direction.

Note that an adsorber may be disposed on both of or at least one of upstream and downstream sides from the fluid vapor delivery zone 57, for adsorption of substances contained in the fluid vapor 71.

Each of the sensor assemblies 79 includes a temperature sensor and a curl sensor for measurement. The temperature sensor detects temperature of the multi-layer film 10. The curl sensor detects a size of a curl of the multi-layer film 10. An example of the temperature sensor is an infrared temperature sensor. An example of the curl sensor is a laser displacement meter.

The transport rollers 27 in the fluid vapor delivery zone 57 are positioned for a non-contact state with a deformed portion of the multi-layer film 10. Specifically, a distance CL1 from the slot nozzle 70 (fluid vapor flow area) to a near one of the transport rollers 27 is equal to or more than 100 mm and equal to or less than 2,500 mm, and preferably equal to or more than 150 mm and equal to or less than 1,000 mm.

Note that a temperature adjustment apparatus may be used for adjusting temperature of the transport rollers 27 in the fluid vapor delivery zone 57 for the purpose of preventing water condensation on the multi-layer film 10 or occurrence of fold creases or wrinkles. The temperature adjustment apparatus includes a jacket, a temperature adjuster and a circulator. The jacket is disposed on the transport rollers 27 for passage of flow of a heat conducting material, such as water and oil. The temperature adjuster adjusts the temperature of the heat conducting material. The circulator circulates the heat conducting material between the jacket and the temperature adjuster. The temperature adjuster preferably adjusts the temperature of the heat conducting material to reduce a difference in the temperature from the temperature of the multi-layer film 10 passing the moving path 24. This is effective in setting the temperature of the transport rollers 27 higher than the multi-layer film 10, or lower than the multi-layer film 10. It is also possible to use a type of the transport rollers 27 in which a coil is incorporated, and a type of the temperature adjustment apparatus for heating the transport rollers 27 having the coil by use of electromagnetic induction.

A controller 81 suitably adjusts conditions related to the preheating gas 61, the dry gas 74 and the fluid vapor 71 according to the temperature and a size of a curl of the multi-layer film 10 read from the sensor assemblies 79, the conditions including the temperature, humidity (fluid vapor content) and flow rate. This is effective in decurling operation.

[Fluid Vapor]

The fluid vapor 71 is gas of substances for decreasing hardness of the support film 22, or specifically for lowering the glass transition temperature Tg of a substance contained in the support film 22. Examples of the substances include methylene chloride, water, organic solvents, mixture of water and an organic solvent, mixture of plural organic solvents, and the like. Examples of the organic solvents include dichloro methane, methyl acetate, acetone and the like.

The fluid vapor 71 can be any one of saturated vapor and superheated vapor. Let BP (deg. C.) be a boiling point of the fluid vapor 71. The temperature of the fluid vapor 71 is preferably in a range equal to or higher than (BP−30) deg. C. and equal to or lower than (BP+30) deg. C., and specifically preferably in a range equal to or higher than BP deg. C. and equal to or lower than (BP+20) deg. C. Also, the temperature of the fluid vapor 71 is preferably equal to or higher than the glass transition temperature of the substance in the support layer 11 by a difference A after a decrease of the glass transition temperature upon contact with the fluid vapor 71. The difference A is 60 deg. C. or lower. Should A be higher than 60 deg. C., a transition from the glass phase to the rubber phase will be difficult, because it is difficult to retain water of a content sufficient for inducing a transition of the support layer 11 from the glass phase to the rubber phase. A ratio AHv/AHf of an absolute humidity AHv at the temperature of the multi-layer film 10 for application of the fluid vapor 71 to a saturation absolute humidity AHf of the fluid vapor 71 is preferably equal to or more than 0.8 and equal to or less than 4.4, and specifically preferably equal to or more than 2.5 and equal to or less than 4.0.

The operation of the embodiment is described now. In FIG. 2, the film dispenser 23 in the multi-layer film production system 20 advances the support film 22 to the moving path 24. The support film 22 becomes the multi-layer film 10 by passing the moving path 24 and moves to the film winder 25. The film winder 25 winds the multi-layer film 10 about a spindle.

Details in relation to the moving path 24 are described now. The coater 31 forms the layer 28 on the support film 22. The dryer 32 blows the dry gas 43 to the layer 28 to evaporate solvent from the layer 28. The ultraviolet irradiator 33 applies ultraviolet rays to the layer 28. In the layer 28, the ultraviolet curable compound is polymerized. The layer 28, therefore, becomes the hard coat layer 12 of FIG. 1. Thus, the multi-layer film 10 having the support layer 11 from the support film 22 and the hard coat layer 12 (See FIG. 1) is produced.

As a volume of the multi-layer film 10 decreases due to polymerization of the ultraviolet curable compound, first internal stress occurs in the multi-layer film 10. A first curl is created in the multi-layer film 10 by the first internal stress to direct the hard coat layer 12 inwards. The fluid vapor sources 72 are controlled by the controller 81 and apply the fluid vapor 71 to the support layer 11 of the multi-layer film 10 in the curled state. The water content of the support layer 11 increases upon contact of the fluid vapor 71, to change the support layer 11 from the glass phase to the rubber phase. After this, the water content of the support layer 11 decreases, to change the support layer 11 from the rubber phase to the glass phase. During this change, shrinkage of the support layer 11 occurs. As a result of this, a second internal stress occurs in the support layer 11. This creates a second curl with which the first curl can be corrected. Finally, the first curl can be removed by the contact with the fluid vapor 71.

At the time of the contact with the fluid vapor 71, a transition from the glass phase to the rubber phase occurs in the support layer 11, which becomes expanded. If a contacting portion of the support layer 11 in contact with one of the transport rollers 27 should expand, fold creases or wrinkles may occur in the multi-layer film 10.

Also, if the multi-layer film 10 is moved by the transport roller 27 at a higher temperature than that of the support layer 11 (for example, by 20-30 deg. C.), the contacting portion of the support layer 11 in contact with the transport roller 27 is expanded. Fold creases or wrinkles may occur on the contacting portion of the support layer 11 in contact with the transport roller 27 upon contact of the support layer 11 on vapor.

However, it is possible in the invention to decurl the multi-layer film 10 and suppress occurrence of fold creases or wrinkles, because the transport rollers 27 are disposed for a non-contact state with the support layer 11 of the rubber phase or an expanded state.

Processes of occurrence of the fold creases or wrinkles are hypothetically described as follows.

[First Process of Occurrence of Fold Creases]

Figure 12:
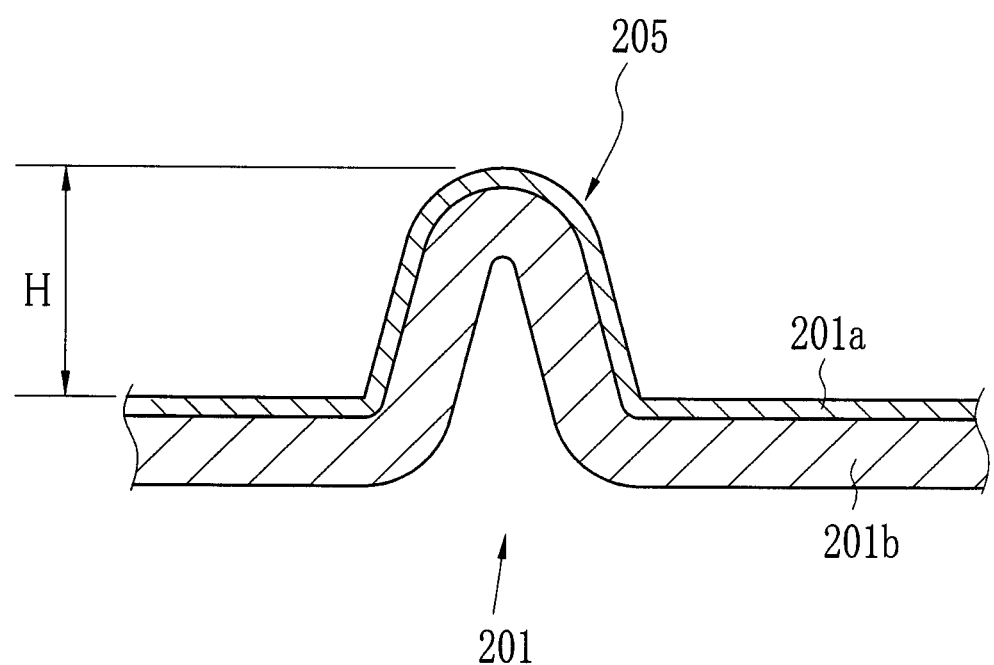
FIG. 12 is a cross section, partially cutaway, illustrating the multi-layer film with a fold crease.

A contacting portion of the support layer 11 in contact with the transport roller 27 is difficult to expand in the width direction due to friction with a peripheral surface of the transport roller 27. The contacting portion expands in a thickness direction, so that the multi-layer film 10 will bend erectly from the peripheral surface of the transport roller 27. As a result, fold creases or wrinkles occur in the multi-layer film 10 as illustrated in FIG. 12.

[Second Process of Occurrence of Fold Creases]

As the support layer 11 expands due to a contact on the transport roller, a first portion of the multi-layer film 10 upstream of the transport roller has a width different from a width of a second portion of the multi-layer film 10 downstream of the transport roller. Thus, fold creases or wrinkles occur on the multi-layer film 10 upon occurrence of inner stress due to the width difference.

When a transition occurs in a portion of the support layer 11 from the glass phase to the rubber phase, expansion of the support layer 11 occurs due to the transition. The support layer 11 becomes thermally expanded upon contact with the transport roller 27 of which the temperature is higher than that of the support layer 11. Due to the expansion of the support layer 11, fold creases or wrinkles in the multi-layer film 10 are possibly created according to either one or both of the two processes.

The Youngs modulus of the support layer 11 in the rubber phase is lower than that in the glass phase. It is difficult to maintain the form of the support layer 11 in the rubber phase upon occurrence of external force or internal stress. Thus, fold creases or wrinkles are likely to occur in the multi-layer film 10 when the support layer 11 is in the rubber phase, because of expansion upon a transition, or thermal expansion of the support layer 11.

Fold creases or wrinkles are likely to occur in the multi-layer film 10 in which the support layer 11 and the hard coat layer 12 are present with a difference in the physical property. For example, fold creases are very likely to occur when a thermal expansion coefficient of the support layer 11 is higher than that of the hard coat layer 12.

Before introducing the multi-layer film 10 in the fluid vapor delivery zone 57, the multi-layer film 10 is introduced in the preheat zone 56 in the invention. In FIG. 3, the preheating gas supply source 62 is controlled by the controller 81 and blows the preheating gas 61 to the multi-layer film 10 introduced in the preheat zone 56. The contact of the multi-layer film 10 on the preheating gas 61 adjusts the temperature of the multi-layer film 10 to set the ratio AHv/AHf of the absolute humidity AHv to the saturation absolute humidity AHf in a predetermined range. Thus, the multi-layer film 10 can be decurled reliably.

As the moving path 24 extends in the upward direction inside the fluid vapor delivery zone 57, it is easy to transport the multi-layer film 10 in a non-contact state of the support layer 11 even in an expanded condition. It is also possible in one or more of the fluid vapor sources 72 to stop discharge of the fluid vapor 71 for adjusting the supply process time required for applying the fluid vapor 71 to the support layer 11. Specifically, a first one of the fluid vapor sources 72 disposed on a downstream side in the moving path 24 is set active for discharging the fluid vapor 71. A second one of the fluid vapor sources 72 disposed on an upstream side is set inactive for the fluid vapor 71.

In the embodiment, the dry gas supply source 75 and the suction device 77 are disposed beside the fluid vapor sources 72 upstream or downstream in the moving direction. This is effective in preventing the transport rollers 27 from contacting an expanding portion, as the expanding portion can be narrowed by suitably disposing the dry gas supply source 75 and the suction device 77.

Figure 4:
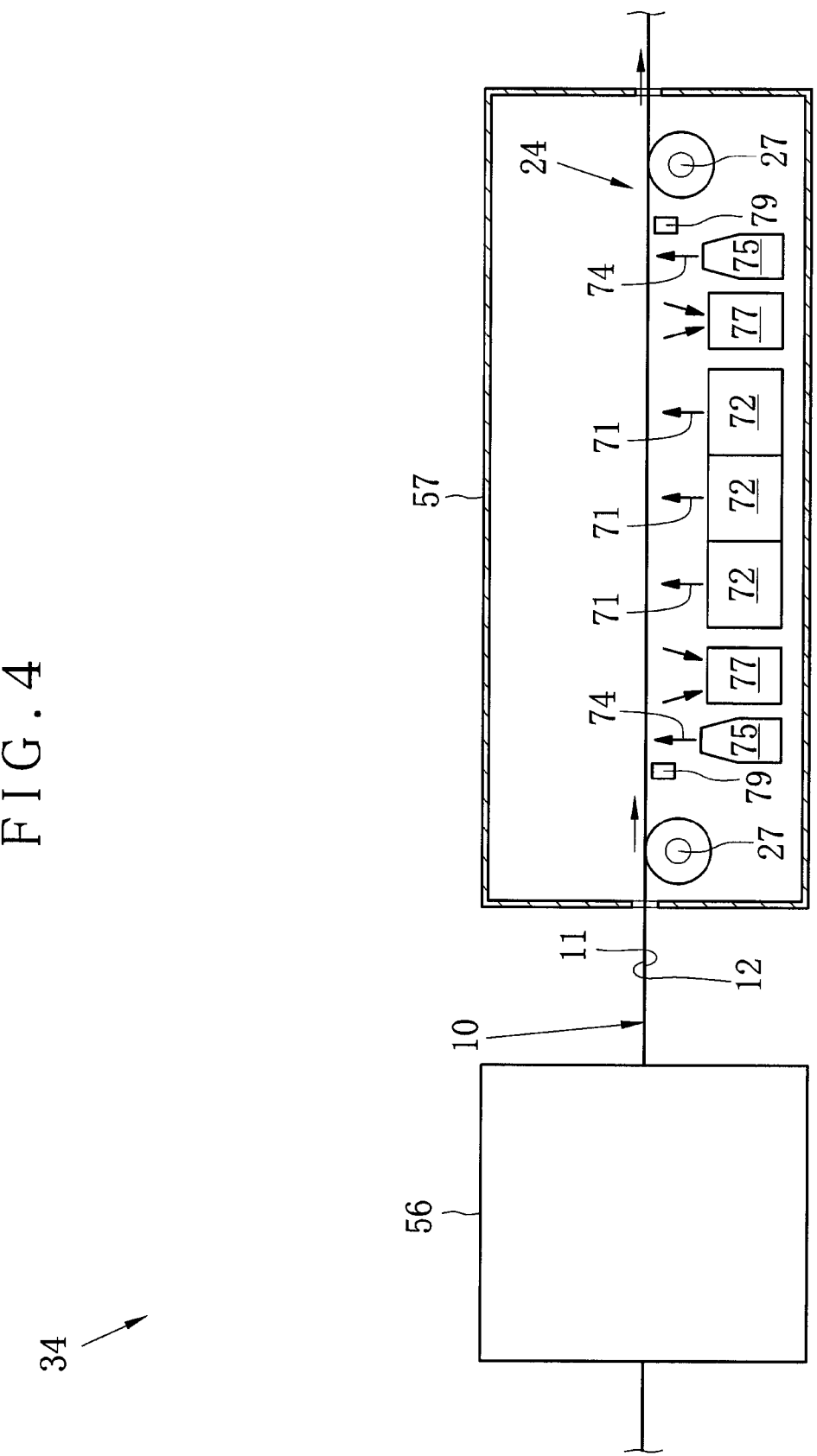
FIG. 4 is an explanatory view in a vertical section, illustrating the fluid vapor delivery zone with horizontally transporting transport rollers as a first moving device.

In the above embodiment, the moving path 24 extends upwards in the fluid vapor delivery zone 57. However, the moving path 24 in the invention is not limited. In FIG. 4, another preferred structure of the moving path 24 is illustrated. The decurling apparatus 34 includes the preheat zone 56 and the fluid vapor delivery zone 57, in which the moving path 24 is horizontal.

Figure 5:
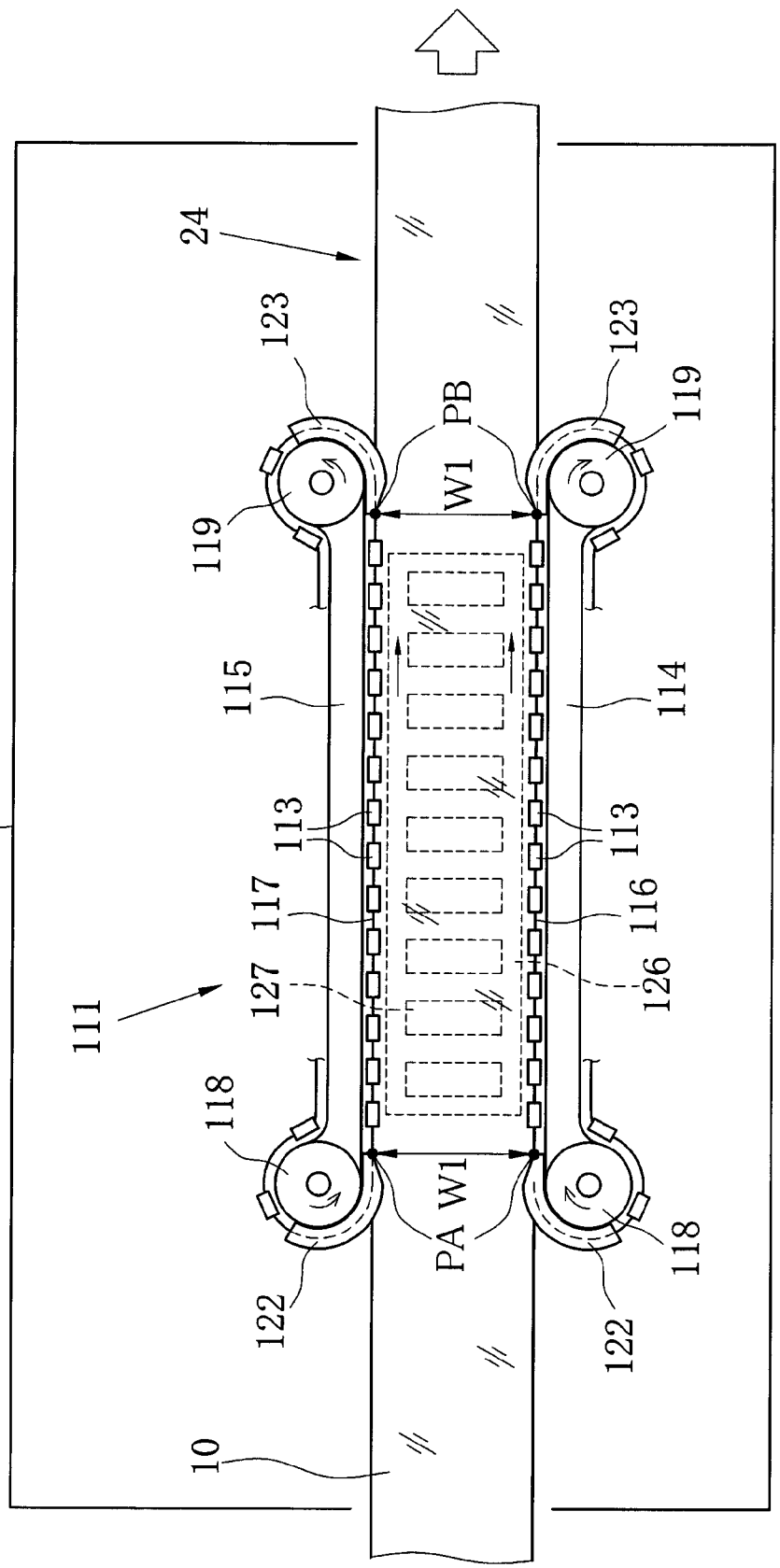
FIG. 5 is a plan illustrating the fluid vapor delivery zone with a clip tentering unit as a second moving device.

In the above embodiments, the transport rollers 27 are used as a moving device for the multi-layer film 10. In FIG. 5, another preferred moving device is illustrated, in which a clip tentering unit 111 or clip tentering machine operates for the multi-layer film 10.

The clip tentering unit 111 includes clip devices 113, rails 114 and 115, and chain devices 116 and 117. The rails 114 and 115 are arranged at a predetermined interval and positioned beside the moving path 24. Drive sprocket wheels 118 are disposed upstream of the rails 114 and 115. Driven sprocket wheels 119 are disposed downstream of the rails 114 and 115.

The chain devices 116 and 117 extend between the drive sprocket wheels 118 and the driven sprocket wheels 119, and are movable along the rails 114 and 115. The clip devices 113 are secured to the chain devices 116 and 117 and arranged at a predetermined interval. In FIG. 5, only part of the clip devices 113 is illustrated for simplicity of the drawing. Rotation of the drive sprocket wheels 118 and the driven sprocket wheels 119 moves the clip devices 113 along the rails 114 and 115.

A guide position PA is defined near to an upstream end of the rails 114 and 115. A release position PB is defined near to a downstream end of the rails 114 and 115. A guide device 122 controls the clip devices 113 having passed the guide position PA to clamp web edge portions of the multi-layer film 10. A release device 123 controls the clip devices 113 having passed the release position PB to release the web edge portions of the multi-layer film 10. An interval W1 between the rails 114 and 115 is constant from the guide position PA to the release position PB.

The passage of the clip devices 113 at the guide position PA and the release position PB transports the multi-layer film 10 while its web edges are clamped by the clip devices 113. In the clip tentering unit 111, a fluid vapor source 126 is disposed between the rails 114 and 115 for applying the fluid vapor 71 to a portion of the multi-layer film 10 located between the web edges. The multi-layer film 10 is transported in a non-contact manner of the expanding portion of the multi-layer film 10 while vapor is supplied to the support layer 11 of the multi-layer film 10.

Note that a direction of the moving path 24 in the use of the clip tentering unit 111 may be vertical in an upward direction, or horizontal.

Figure 6:
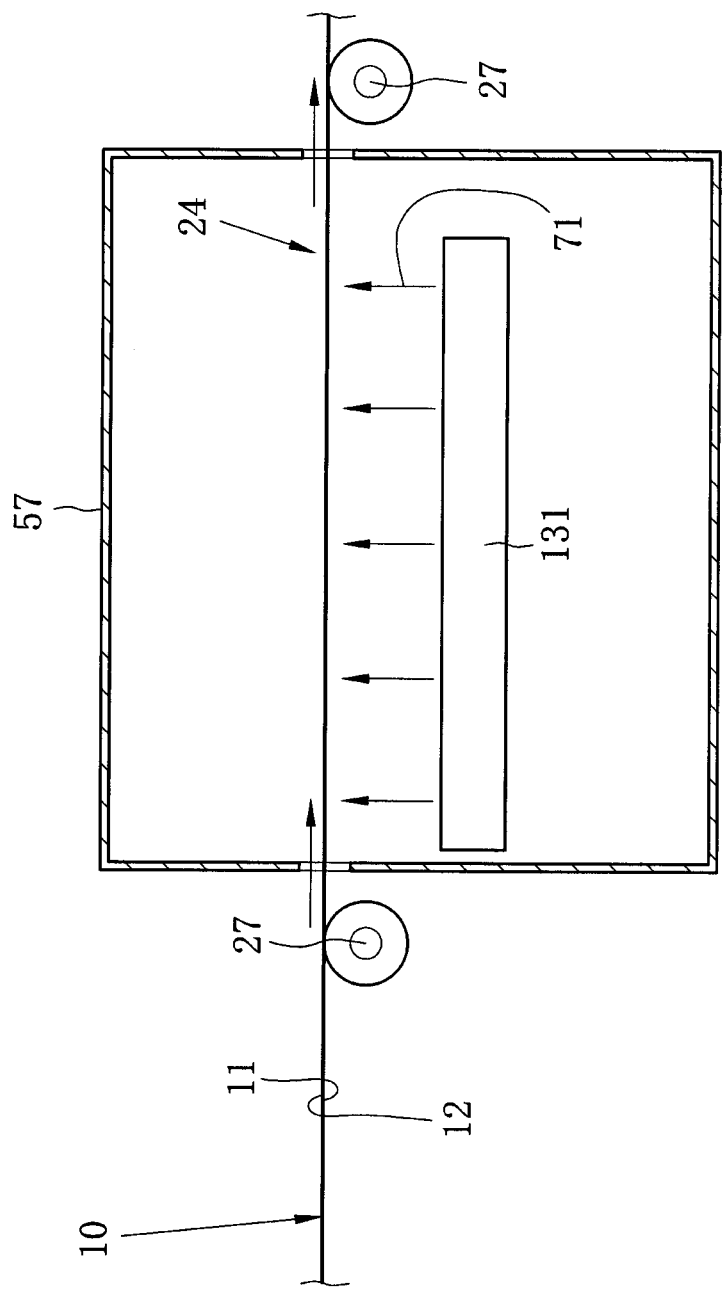
FIG. 6 is an explanatory view in a side elevation, illustrating the fluid vapor delivery zone with a floating transport device as a third moving device.

In FIG. 6, another preferred moving device for the multi-layer film 10 is illustrated. A floating transport device 131 as moving device is disposed under the moving path 24. The floating transport device 131 blows the fluid vapor 71 to the moving path 24 as floating gas or a gas flow. Note that the fluid vapor sources 72 may be used additionally to the floating transport device 131 for floating gas in the moving path 24. The fluid vapor sources 72 may be disposed either over or under the moving path 24, and can be disposed respectively over and under the moving path 24. The multi-layer film 10 can be transported while fluid vapor contacts the support layer 11 of the multi-layer film 10 in a non-contact state on the expanding portion of the multi-layer film 10.

Figure 7:
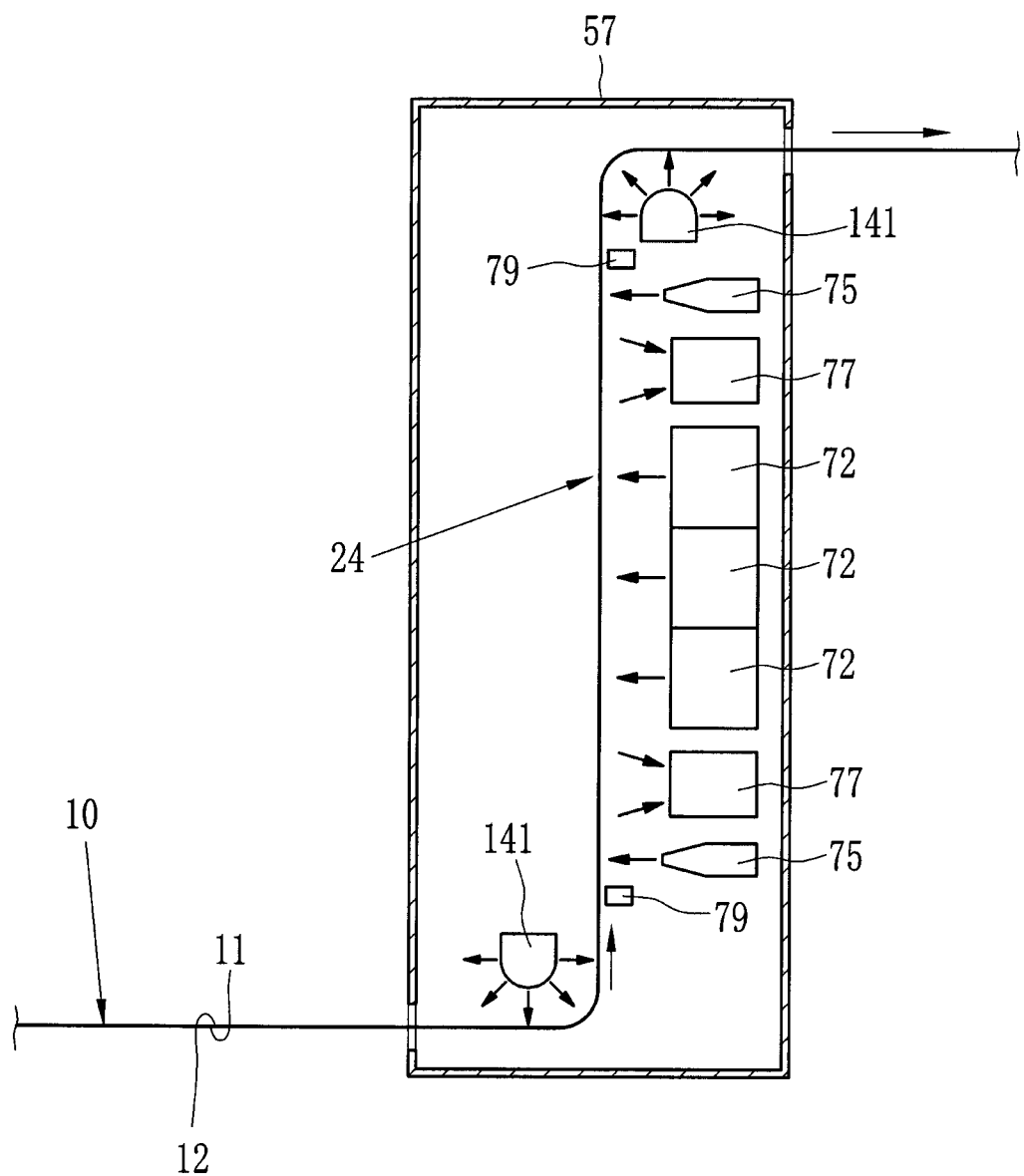
FIG. 7 is an explanatory view in a side elevation, illustrating the fluid vapor delivery zone with turn bar assemblies as a fourth moving device.
Figure 8:
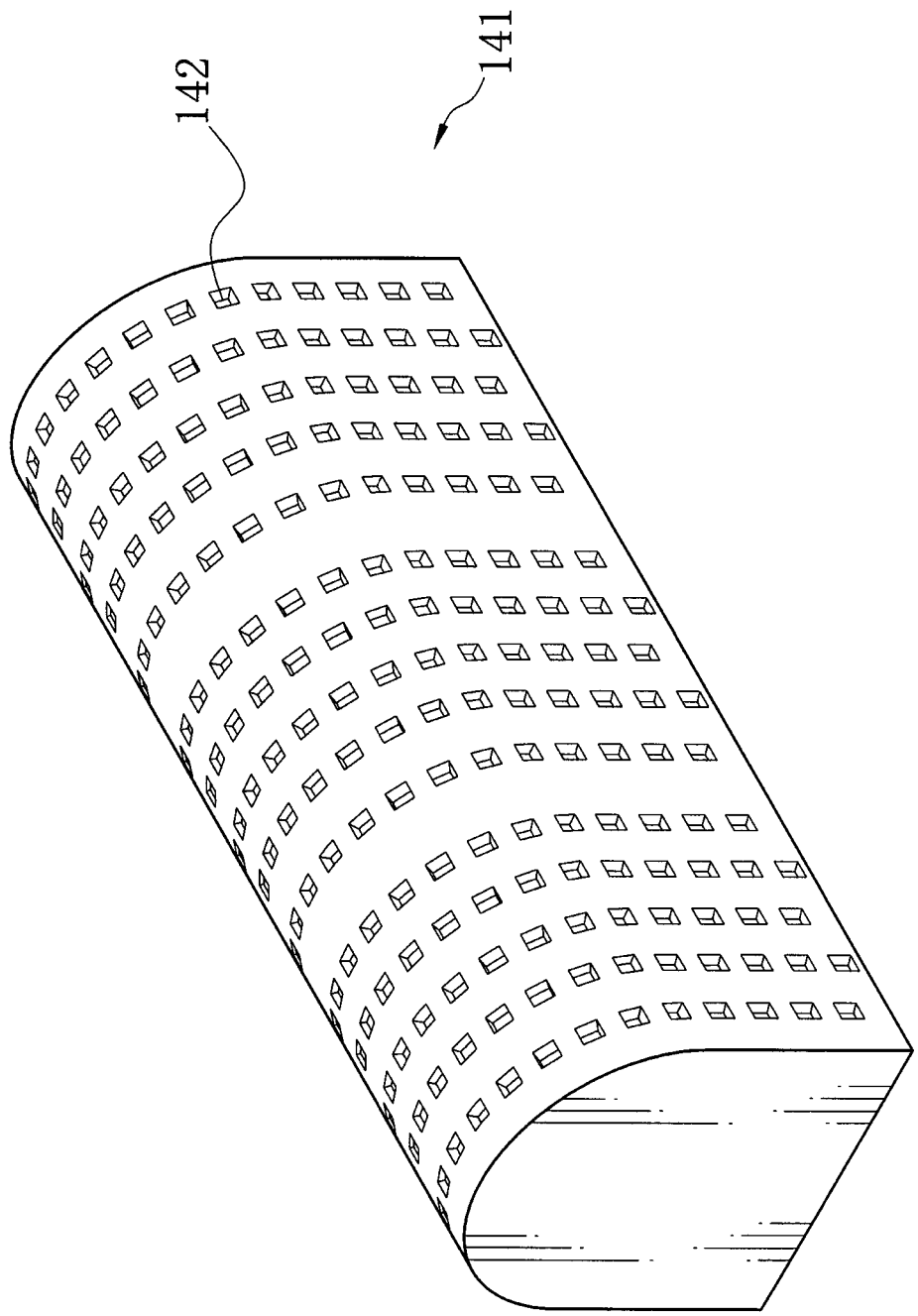
FIG. 8 is a perspective view illustrating one of the turn bar assemblies.

In FIGS. 7 and 8, a plurality of turn bar assemblies 141 are used for discharging the fluid vapor 71 as floating gas. Openings 142 are formed in the turn bar assemblies 141. A first one of the turn bar assemblies 141 has the openings 142 directed downwards. A second one of the turn bar assemblies 141 are disposed higher than the first, and has the openings 142 directed upwards. Thus, it is possible to transport the multi-layer film 10 in a floating state and in the upward direction. Note that the number of the turn bar assemblies 141 can be three or more. The turn bar assemblies 141 can be arranged in a zigzag form.

In the above embodiments, the transport rollers 27 support the multi-layer film 10 upwards. Instead, nip rollers can be used for nipping the multi-layer film 10 with pressure. This is effective in transporting the multi-layer film 10 in a non-contact state on an expanding portion of the multi-layer film 10.

Figure 9:
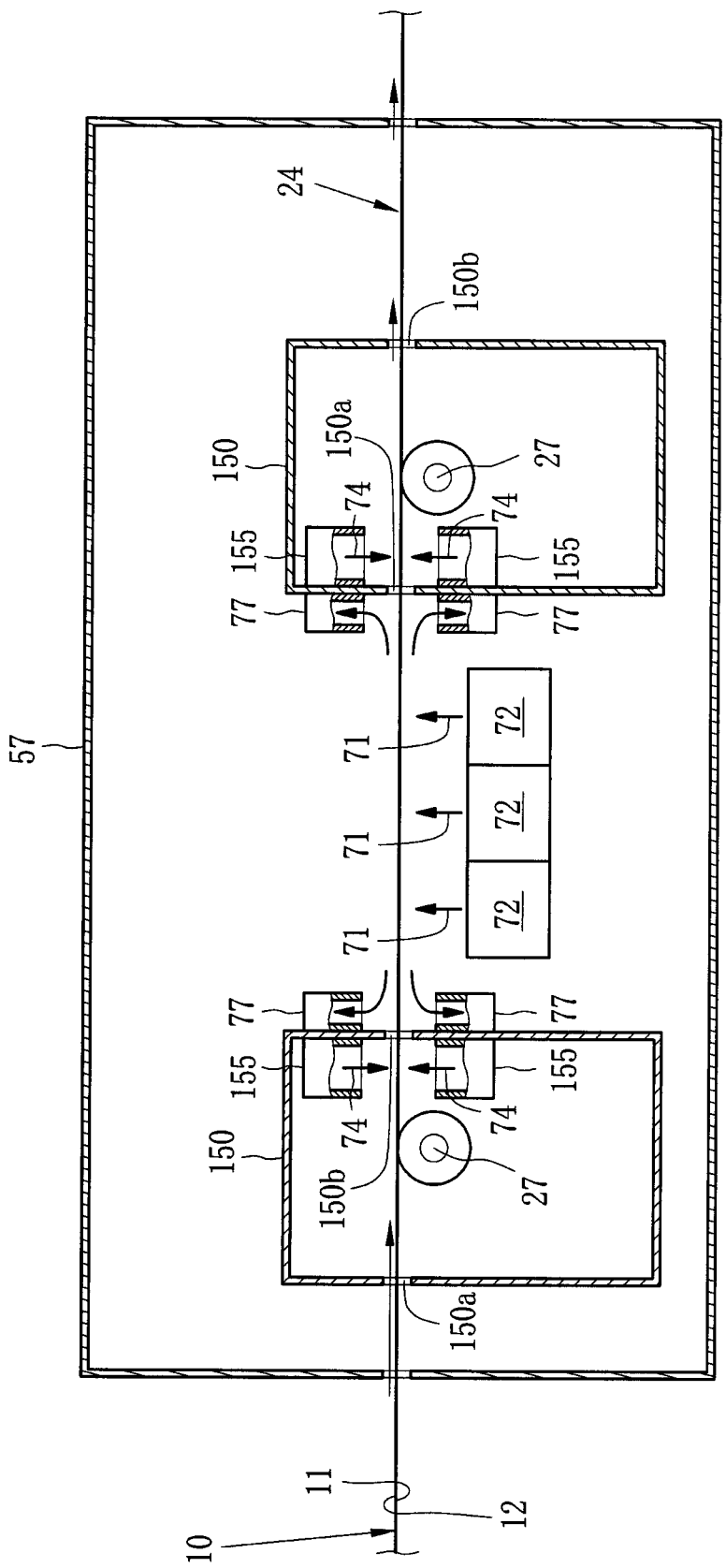
FIG. 9 is an explanatory view in a vertical section, illustrating another preferred combination of the fluid vapor delivery zone with dry conditioning zones.

In FIG. 9, another preferred structure of dry conditioning zones 150 or chambers or cases is illustrated, as low humidity zones or chambers or cases. There are an inlet 150a and an outlet 150b, between which the transport rollers 27 are disposed. The fluid vapor 71 which reaches a contacting portion of the multi-layer film 10 in contact with the transport rollers 27 is reduced by this structure. The contacting portion can be maintained in at a low content of fluid vapor, for example, 50% RH or lower. Thus, the dry conditioning zones 150 can prevent a high humidity condition (high fluid vapor content) in the vicinity of the contacting portion and prevent fold creases or wrinkles.

The dry conditioning zones 150 are disposed for the transport rollers 27 both upstream and downstream of the fluid vapor sources 72. However, one dry conditioning zone 150 can be used for only one of the transport rollers 27 either upstream or downstream of the fluid vapor sources 72.

Also, a dry gas supply source 155 as drying conditioner can be disposed to supply the dry gas 74 to a contacting portion of the multi-layer film 10 for contact with the transport rollers 27, for example, the dry gas 74 of 10 RH % or lower. A position of the dry gas supply source 155 between the fluid vapor sources 72 and the transport rollers 27 is not limited particularly.

Also, the suction device 77 can be disposed for suction of the fluid vapor 71 directed toward a portion of the multi-layer film 10 in contact with the transport rollers 27. A position of the suction device 77 between the fluid vapor sources 72 and the transport rollers 27 is not limited particularly.

Note that the dry conditioning zones 150 may be omitted if the dry gas supply source 155 or the suction device 77 is disposed.

Figure 10:
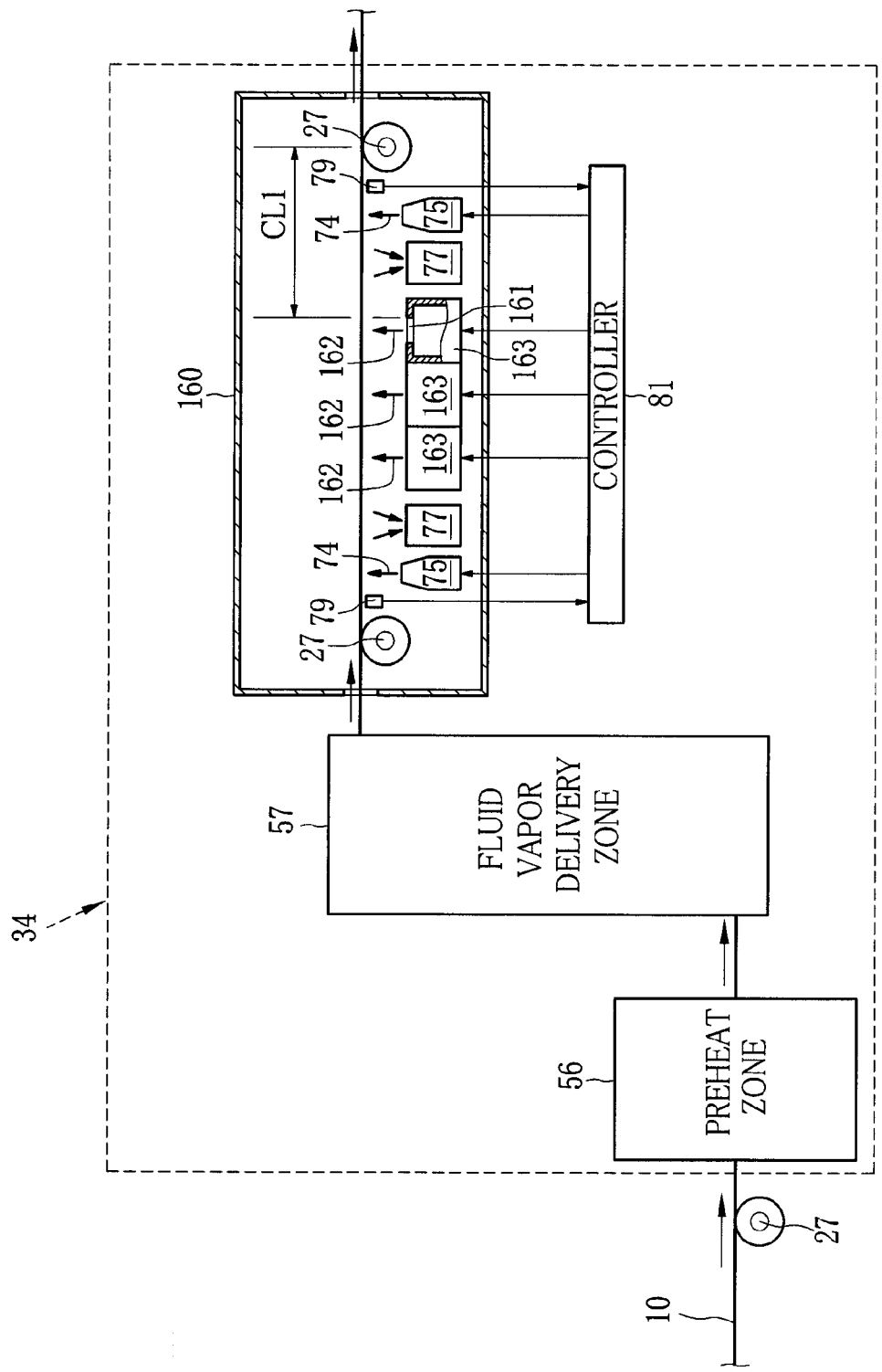
FIG. 10 is an explanatory view in a vertical section, illustrating one preferred decurling apparatus having a cooling zone.
Figure 11:
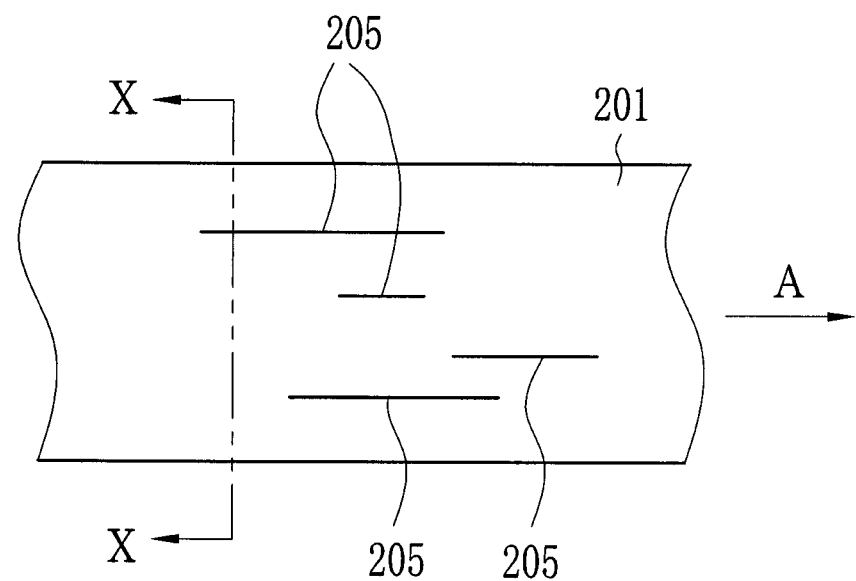
FIG. 11 is a plan illustrating a state of multi-layer film where fold creases are present.

In the embodiment, the decurling apparatus 34 having the preheat zone 56 and the fluid vapor delivery zone 57 is used. In FIG. 10, one preferred structure of the decurling apparatus 34 is illustrated, in which a cooling zone 160 or chamber or case is disposed in addition to the preheat zone 56 and the fluid vapor delivery zone 57.

The cooling zone 160 is positioned downstream of the fluid vapor delivery zone 57. Cooling gas supply sources 163 have a slot nozzle 161. Cooling gas 162 is discharged through the slot nozzle 161. The cooling zone 160 is structurally the same as the fluid vapor delivery zone 57 but with a difference of using the cooling gas supply sources 163 in place of the fluid vapor sources 72.

A task of the cooling step is performed in the cooling zone 160 to cool the multi-layer film 10 at a predetermined cooling speed. In the cooling step, second inner stress of a greater value occurs because of greater shrinkage of the support layer 11. It is possible in the cooling step to raise performance of decurling. Note that the cooling step should be carried out immediately after the vapor supply step.

However, it is likely in the cooling step that fold creases or wrinkles occur on the multi-layer film 10. A process of the occurrence of fold creases is hypothetically described as follows. If a temperature of the transport roller 27 to transport the multi-layer film 10 is lower than that of the support layer 11, for example by 20-30 deg. C., shrinkage occurs on the support layer 11 in contact with the transport roller 27. In response, a difference occurs between a width of a first portion of the multi-layer film 10 upstream of the transport roller 27 and that of a second portion of the multi-layer film 10 downstream of the transport roller 27. Inner stress is created due to the difference in the width, to create fold creases on the multi-layer film 10 in FIG. 12. When the transition occurs from the rubber phase to the glass phase in one portion of the support layer 11, the support layer 11 shrinks characteristically. Similarly, fold creases occur on the multi-layer film 10 as illustrated in FIG. 12 upon contact of the support layer 11 being shrunk with the transport roller 27.

When the support layer 11 is in the rubber phase, fold creases or wrinkles are likely to occur in the multi-layer film 10 due to shrinkage upon the transition, or thermal shrinkage of the support layer 11.

In the embodiment, the transport rollers 27 are disposed for a non-contact state with the support layer 11 in the rubber phase or the support layer 11 in a shrunk state. The multi-layer film 10 can be decurled and also prevented from having fold creases or wrinkles.

In the above embodiments, the cooling zone or case for the cooling step is structurally the same as the fluid vapor delivery zone 57 in FIG. 4. However, it is possible to use the cooling zone or case in the same structure as the fluid vapor delivery zone 57 according to either one of FIGS. 3, 5-7 and 9.

If the temperature of the support layer 11 is higher than the glass transition temperature Tg, or in the rubber phase in the fluid vapor delivery zone 57, it is preferable to reduce a difference in the temperature between the transport rollers 27 and the support layer 11 to 8 deg. C. or less. If the temperature of the support layer 11 is lower than the glass transition temperature Tg, or in the glass phase in the fluid vapor delivery zone 57, it is preferable to reduce a difference in the temperature between the transport rollers 27 and the support layer 11 to 30 deg. C. or less. This is effective in reliably preventing occurrence of fold creases or wrinkles.

It is preferable to transport a portion of the support layer 11 in the rubber phase in a non-contact state in each of the zones or cases inside the decurling apparatus 34. To transport the portion of the support layer 11 in the rubber phase, it is preferable to apply cooling gas to the multi-layer film 10 to cool the multi-layer film 10 until the support layer 11 changes from the rubber phase to the glass phase. The portion of the support layer 11 in the glass phase can be transported safely by the transport rollers 27.

It is possible to carry out dehumidification to shorten time of the rubber phase of the support layer 11. In the dehumidification, conditioned gas in which fluid vapor is adjusted is blown to the support layer 11 to eliminate molecules of water from the support layer 11. The dehumidification can be carried out in the cooling zone 160, or between the fluid vapor delivery zone 57 and the cooling zone 160. Also, a shielding plate can be disposed at an inlet of the cooling zone 160 to prevent entry of fluid vapor from the fluid vapor delivery zone 57 into the cooling zone 160.

It is preferable to add the anti condensation control to each of the steps carried out before and after the vapor supply step. In the anti condensation control, temperature of the multi-layer film 10 or a dew point of the atmosphere around the multi-layer film 10 is adjusted to set the temperature higher than the dew point. It is also possible to perform a task of the dehumidification described above in the anti condensation control.

In the embodiments, the fluid vapor sources 72 are three arranged in a sequence. The number of the those is not limited particularly, and can be one. A large type of the fluid vapor source 72 can include a plurality of the slot nozzle 70. A nozzle of the fluid vapor source 72 can be any suitable type of well-known nozzle other than the slot nozzle 70.

In the above embodiments, the coating solution contains the ultraviolet curable compound and the solvent. However, a coating solution may contain the electron beam curable compound and the solvent. For this compound, an electron beam can be applied as curing energy instead of ultraviolet radiation.

[Cellulose Acylates]

A preferable cellulose acylate is cellulose triacetate (TAC). Preferable examples of cellulose acylates satisfy all of the conditions I-III in relation to a degree of substitution of the acyl group formed by substituting hydroxy groups in cellulose, as follows:

$2.5 \leq A+B \leq 3.0$　　　　　　　　　　　　　　　　Condition I $0 \leq A \leq 3.0$　　　　　　　　　　　　　　　　　Condition II $0 \leq B \leq 2.9$　　　　　　　　　　　　　　　　　Condition III where A and B represent the degree of substitution of the acyl group. A represents a degree of substitution of an acetyl group. B represents a total degree of substitution of acyl groups having 3-22 carbon atoms. Preferably, the cellulose triacetate should include 90 wt. % or more of particles of 0.1-4 mm.

The cellulose is constructed by glucose units making a beta-1,4 bond, and each glucose unit has a liberated hydroxy group at 2, 3 and 6-positions. Cellulose acylate is a polymer in which part or whole of the hydroxy groups are esterified so that the hydrogen is substituted by acyl groups having two or more carbon atoms. The degree of substitution for the acyl groups in cellulose acylate is a degree of esterification at 2, 3 or 6-position in cellulose. (When 100% of the hydroxy group at the same position is substituted, the degree of substitution at this position is 1.)

The total degree of substitution DS2+DS3+DS6 for the acyl groups at 2, 3 or 6-position is in the range of 2.00-3.00, preferably 2.22-2.90, and in particular preferably 2.40-2.88. Further, a ratio DS6/(DS2+DS3+DS6) is preferably 0.28 or more, and particularly 0.30 or more, and especially in the range of 0.31-0.34. The signs DS2, DS3 and DS6 are degrees of substitution for the acyl groups at respectively 2, 3 and 6-positions in hydroxy groups in the glucose unit.

The cellulose acylate in the invention may contain an acyl group of a single example, but can contain acyl groups of two or more examples. If two or more acyl groups are contained, one of the plural acyl groups should be preferably an acetyl group. Let DSA be a total degree of substitution for the acetyl groups. Let DSB be a total degree of substitution for acyl groups at 2, 3 or 6-position different from the acetyl groups. The value DSA+DSB is preferably in the range of 2.22-2.90, and particularly in the range of 2.40-2.88. Further, the DSB is preferably at least 0.30, and especially at least 0.70. Furthermore, in the DSB, the percentage of a substituent group at 6-position is preferably at least 20%, particularly at least 25%, especially at least 30%, and most especially at least 33%. Further, the value DSA+DSB at 6-position is at least 0.75, particularly at least 0.80, and especially at least 0.85. Cellulose acylate satisfying those conditions can be used to prepare a solution or dope having a preferable solubility. Especially when a chlorine-free type organic solvent is used, the adequate dope can be prepared. Also, the dope can be prepared so as to have a low viscosity and higher filterability.

A raw material from which cellulose for the cellulose acylates is produced may be any one of linter (cotton linter) and pulp.

Examples of acyl groups in cellulose acylates having two or more carbon atoms are not limited, and can be aliphatic groups, aryl groups, and the like. For example, cellulose acylates may be alkyl carbonyl esters, alkenyl carbonyl esters, aromatic carbonyl esters, aromatic alkyl carbonyl esters, and the like of cellulose, and can further contain a substituent group. Preferable examples of groups include: propionyl, butanoyl, pentanoyl, hexanoyl, octanoyl, decanoyl, dodecanoyl, tridecanoyl, tetradecanoyl, hexadecanoyl, octadecanoyl, iso-butanoyl, tert-butanoyl, cyclohexane carbonyl, oleoyl, benzoyl, naphthyl carbonyl, and cinnamoyl. Among those, particularly preferable groups are propionyl, butanoyl, dodecanoyl, octadecanoyl, tert-butanoyl, oleoyl, benzoyl, naphthyl carbonyl, and cinnamoyl. Further, specifically preferable groups are propionyl and butanoyl.

Sample 1

The multi-layer film production system 20 in FIG. 2 was operated. The support film of a flat form was introduced to the coater 31, the dryer 32 and the ultraviolet irradiator 33 in series, to produce a multi-layer film having a support layer of the support film with a thickness of 80 microns and a hard coat layer of a thickness of 9 microns. There occurred a curl with the multi-layer film from the ultraviolet irradiator 33 in a form to direct the hard coat layer inwards. An amount of a curvature of the curl of the multi-layer film was 20.9 $m^{-1}$. Definition and determination of the curvature of the curl of the multi-layer film will be described later in detail.

The preheating gas supply source 62 applied the preheating gas 61 to the multi-layer film 10 for six (6) seconds at a flow rate of 10 meters per second, and temperature of 110 deg. C., and kept the surface of the multi-layer film 10 in the preheat zone 56 at the temperature of 80 deg. C.

The fluid vapor sources 72 applied the fluid vapor 71 to the multi-layer film 10 for two (2) seconds at a flow rate of 5 meters per second, temperature of 110 deg. C., and absolute humidity of 575 $g/m^3$. A suction flow rate Vin of the suction device 77 was 0 $Nm^3$ per minute. A flow rate v1 of the dry gas 74 from the dry gas supply source 75 was 0 m/s. The distance CL1 between the slot nozzle 70 and one of the transport rollers 27 was 90 mm.

[Measurement of the Curvature of the Curl]

The multi-layer film discharged from the decurling apparatus was cut into strips one of which had a size of 5 mm in the moving direction of the web. The strip was also slitted at an interval of 150 mm in the web width direction of the multi-layer film into film pieces each of which was 5×150 mm large. Then one of the film pieces was placed on a horizontally disposed flat support table by directing the hard coat layer downwards. The film piece as viewed in an elevation was arcuate convexly up from the support table. Let L be a length of a line segment defined between end points of the film piece in the web width direction. Let H be a height of a highest film point of the film piece with reference to the support table. The length L and the height H were measured. Then an amount C of the curvature of the curl of the film piece was calculated in the web width direction according to the length L and the height H.

Samples 2-9

Sample 1 was repeated with differences in that the suction flow rate Vin, distance CL1 and flow rate v1 of the dry gas 74 were determined at values indicated in Table 1, to produce the multi-layer film 10.

TABLE 1

| Samples | Vin (Nm³/min) | CL1 (mm) | v1 (m/sec) | Evaluation |
|---|---|---|---|---|
| 1 | 0 | 90 | 0 | x |
| 2 | 0 | 100 | 0 | o |
| 3 | 0 | 1,500 | 0 | o |
| 4 | 0 | 90 | 5 | o |
| 5 | 10 | 90 | 0 | o |
| 6 | 10 | 100 | 0 | o |
| 7 | 10 | 90 | 5 | o |
| 8 | 0 | 100 | 5 | o |
| 9 | 10 | 100 | 5 | o |

[Evaluation of Fold Creases]

Samples 1-9 were observed by human eyes for occurrence of fold creases or wrinkles on the multi-layer film 10, and evaluated as indicated in Table 1. In the table, sign o denotes absence of visible fold creases. Sign x denotes presence of visible fold creases. In conclusion, good results were obtained from Samples 2-9.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A decurling method for a continuous multi-layer film including a first layer having a first film surface, and a second layer, overlaid on said first layer opposite to said first film surface, having an external second film surface, wherein there is a curling tendency in an outward direction with said second film surface, said decurling method comprising steps of:

transporting said multi-layer film by a plurality of transport rollers arranged in a longitudinal direction of said multi-layer film for supporting said external second film surface, with said multi-layer film being transported in an upward direction;

preheating said multi-layer film within a range of setting said second layer at a temperature equal to or lower than a glass transition temperature of a component therein;

inducing a first transition of said second layer during transport into a rubber phase by supplying fluid vapor on said second film surface, the fluid vapor being discharged in a fluid vapor flow area positioned between two adjacent transport rollers among said transport rollers along said multi-layer film, a distance between said fluid vapor flow area and said transport rollers being equal to or more than 100 mm;

maintaining a fluid vapor content of a contacting portion of said multi-layer film contacting said transport rollers in a range lower than a fluid vapor content of said second film surface supplied with said fluid vapor, said fluid vapor directed toward said contacting portion being aspirated or blocked, dry gas being supplied to said contacting portion;

inducing a second transition of said second layer from said rubber phase into a glass phase by stopping supplying said fluid vapor;

wherein during said first and second transition, said multi-layer film is transported while said multi-layer film is prevented from contacting a solid object.

2. The decurling method as defined in claim 1, wherein floating gas is discharged upwards to said multi-layer film for transport by floating said multi-layer film.

3. The decurling method as defined in claim 1, wherein in said transporting step, edge portions of said multi-layer film are clamped by use of clip devices while said clip devices are moved, to transport said multi-layer film longitudinally.

4. The decurling method as defined in claim 1, wherein said first layer is formed from a polymer produced from an ultraviolet curable compound or an electron beam curable compound, and said second layer is formed from cellulose acylate.

5. The decurling method as defined in claim 4, wherein said fluid vapor comprises water vapor.

6. The decurling method as defined in claim 1, wherein a thickness of the multilayer film is from 5 μm to 120 μm.

7. The decurling method as defined in claim 1, wherein a thickness of the multilayer film is from 40 μm to 100 μm.

8. The decurling method as defined in claim 1, wherein a ratio between a thickness of the first layer to a thickness of the second layer is from 0.04 to 0.50.

9. The decurling method as defined in claim 1, wherein a ratio between a thickness of the first layer to a thickness of the second layer is from 0.10 to 0.40.

10. The decurling method as defined in claim 1, wherein the second layer is formed by coating the first layer with a coating solution containing an ultraviolet curable compound dissolved or dispersed colloidally therein.

11. The decurling method as defined in claim 10, wherein the coating solution contains from 10 wt % to 95 wt % of the ultraviolet curable compound.

12. The decurling method as defined in claim 10, wherein the ultraviolet curable compound contains a functional group selected from the group consisting of a (meth)acryloyl group, a vinyl group, a styryl group and an allyl group.

13. The decurling method as defined in claim 10, wherein the ultraviolet curable compound contains a (meth)acryloyl functional group.

14. The decurling method as defined in claim 1, wherein the multi-layer film is preheated with preheating gas to set a temperature Tf of compounds in a support layer near a glass transition temperature Tg of the support layer without becoming higher than the glass transition temperature Tg, and a range of Tg-Tf is from 30° C. to 80° C.

* * * * *